United States Patent
Lim et al.

(10) Patent No.: US 8,803,793 B2
(45) Date of Patent: Aug. 12, 2014

(54) ELECTRO PHORETIC DISPLAY AND DRIVING METHOD THEREOF

(75) Inventors: Jae-Ik Lim, Yongin (KR); Min-Woo Kim, Yongin (KR); Jae-Hyun Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 720 days.

(21) Appl. No.: 13/064,380

(22) Filed: Mar. 22, 2011

(65) Prior Publication Data
US 2012/0032992 A1 Feb. 9, 2012

(30) Foreign Application Priority Data

Aug. 6, 2010 (KR) .......................... 10-2010-0076096

(51) Int. Cl.
G09G 3/34 (2006.01)
G09G 3/36 (2006.01)
G06F 3/038 (2013.01)
G09G 5/00 (2006.01)
G09G 5/10 (2006.01)

(52) U.S. Cl.
USPC ............. 345/107; 345/89; 345/690; 345/204; 345/87

(58) Field of Classification Search
CPC ...... G09G 3/344; G09G 3/446; G09G 3/3453
USPC ..................... 345/84, 87–104, 107, 204, 690; 359/296
See application file for complete search history.

(56) References Cited

U.S. PATENT DOCUMENTS 6,046,718 A * 4/2000 Suzuki et al. ................. 345/100
2005/0140576 A1 * 6/2005 Sawada et al. .................. 345/30

FOREIGN PATENT DOCUMENTS

| KR | 10-2008-0045333 A | 5/2008 | | |
|---|---|---|---|---|
| KR | 10-2008-0099732 A | 11/2008 | | |
| KR | 10-2009-0073 | * | 7/2009 | ............. G02F 1/167 |
| KR | 10-2009-0073887 A | 7/2009 | | |

* cited by examiner

Primary Examiner — Sumati Lefkowitz
Assistant Examiner — David Tung
(74) Attorney, Agent, or Firm — Lee & Morse, P.C.

(57) ABSTRACT

An exemplary embodiment provides an electro phoretic display that includes a lower substrate, a first pixel electrode on the lower substrate, an electronic ink layer on the first pixel electrode. The electro phoretic display further includes a common electrode on the electronic ink layer, a liquid crystal layer implementing a color on the common electrode, a second pixel electrode on the liquid crystal layer, and an upper substrate on the second pixel electrode.

2 Claims, 12 Drawing Sheets

ELECTRO PHORETIC DISPLAY AND DRIVING METHOD THEREOF

BACKGROUND

1. Field

The described technology relates generally to an electro phoretic display and a driving method thereof.

2. Description of the Related Art

Electro phoretic displays (EPD) include flat panel display devices that are used, e.g., in electronic books. Various types electro phoretic displays have been proposed.

Among those, an electronic ink type electro phoretic display has been proposed that includes two display panels having electric field generation electrodes, and electronic ink between the two display panels. The electronic ink may include both a plurality of black or white positive charged particles and a plurality of black or white negative charged particles in a microcapsule. The electro phoretic display may display an image by moving the white and black charged particles from the electronic ink to electrodes having opposite polarities by using potential difference at both ends of the electrodes due to voltage applied to opposite electrodes, and by reflecting external light.

The electro phoretic display has high reflectivity and contrast ratio, and substantially does not depend on the viewing angle, unlike the liquid crystal display (LCD). Such that the electro phoretic display is able to display an image with a comfortable feeling, such as paper. Further, the electro phoretic display consumes less power because it is able to maintain the image even if voltage is not continuously applied, due to, e.g., the bi-stable characteristics of white and black charged particles.

A color filter including a cholesteric-type liquid crystal has been used to show colors in the electro phoretic display including white and black charged particles. However, in this case, although white color reflectivity can be improved when a white is shown, brag reflection is generated by the color filer including the cholesteric liquid crystal when a black is shown, thereby increasing reflectivity of black. Accordingly, contrast ratio and chroma are deteriorated.

The above information disclosed in this Background section is only for enhancement of understanding of the background of the described technology. Therefore, it may contain information that does not form the prior art that is already known in this country to a person of ordinary skill in the art.

SUMMARY

Embodiments are therefore directed to an electro phoretic display and driving method thereof, which substantially overcome one or more of the problems due to the limitations and disadvantages of the related art.

It is therefore a feature of an embodiment to provide a color electro phoretic display having advantages of having improved reflectivity, contrast ratio, and chroma, and a driving method thereof.

At least one of the above and other features and advantages may be realized by providing an electro phoretic display that includes a lower substrate, a first pixel electrode on the lower substrate, an electronic ink layer on the first pixel electrode, a common electrode on the electronic ink layer, a liquid crystal layer implementing a color on the common electrode, a second pixel electrode on the liquid crystal layer, and an upper substrate on the second pixel electrode.

The liquid crystal layer may be a cholesteric liquid crystal layer, a barrier rib dividing the cholesteric liquid crystal layer for each pixel may be further included, or the cholesteric liquid crystal layer may be composed of a plurality of cholesteric liquid crystal capsules.

The liquid crystal layer may be one of an ECB mode, a TN mode, a VA mode, a PNLC mode, and a PDLC mode, the liquid crystal layer may include color liquid crystal molecules, and a barrier rib dividing the liquid crystal layer for each pixel may be further included.

The electronic ink of the electronic ink layer may include a spherical microcapsule and a plurality of white charged particles and a plurality of black charged particles disposed in the microcapsule, and the white charged particles and the black charged particles may be charged with opposite polarities.

The electronic ink of the electronic ink layer may include a spherical microcapsule and black fluid in the microcapsule, and a plurality of white charged particles distributed in the black fluid, and the white charged particles may be charged in positive or negative.

At least one of the above and other features and advantages may also be realized by providing a driving method of an electro phoretic display that includes a first pixel electrode on a lower substrate, an electronic ink layer on the first pixel electrode, a common electrode on the electronic ink layer, a liquid crystal layer on the common electrode, a second pixel electrode on the liquid crystal layer, and an upper substrate on the second pixel electrode. The method may include adjusting position of white charged particles and black charged particles in the electronic ink layer by applying gray voltage between the first pixel electrode and the common electrode; and adjusting the liquid crystal layer with a color voltage applied between the common electrode and the second pixel electrode to implement a color.

The liquid crystal layer may be a cholesteric liquid crystal layer, in which the implementing of a specific color may include any one or more of implementing white by not applying the color voltage to make the liquid crystal layer of all of the pixels in a planar state, with the white charged particles of the electronic ink layer of all of the pixels positioned upper than the black charged particles, implementing black by applying the color voltage to make the liquid crystal layer of all of the pixels in a focal conic state, with the black charged particles of the electronic ink layer of all of the pixels positioned upper than the white charged particles, and implementing a specific color in a specific pixel by not applying the color voltage to the specific pixel to make the liquid crystal layer in the planar state, with the black charged particles of the electronic ink layer of all of the pixels positioned upper than the white charged particles.

The liquid crystal layer is any one selected from an ECB mode, a TN mode, a VA mode, a PNLC mode, and a PDLC mode, the liquid crystal layer may include color liquid crystal molecules, and the implementing of a specific color may include one or more of implementing white by arranging the liquid crystal molecules of the liquid crystal layer of all of the pixels in an electric field direction, with the white charged particles of the ink electron layer of all of the pixels positioned upper than the black charged particles, implementing black by irregularly arranging the liquid crystal molecules of the liquid crystal layer of all of the pixels, with the black charged particles of the ink electron layer of all of the pixels positioned upper than the white charged particles, and implementing a specific color in a specific pixel by irregularly arranging the liquid crystal molecules of the liquid crystal layer of the specific pixel, with the white charged particles of the electronic ink layer corresponding to the specific pixel positioned upper than the black charged particles In this method, the specific color implemented in the specific pixel is the same as the color of color liquid molecules of the liquid crystal layer corresponding to the specific pixel.

According to the exemplary embodiment, it is possible to change reflectivity of a cholesteric liquid crystal layer and an electronic ink layer and improve reflectivity, a contrast ratio, and chroma, by forming a first pixel electrode and a common electrode under and on an electronic ink layer, forming a cholesteric liquid crystal layer and a second pixel electrode on a common electrode, and adjusting gray voltage and color voltage.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
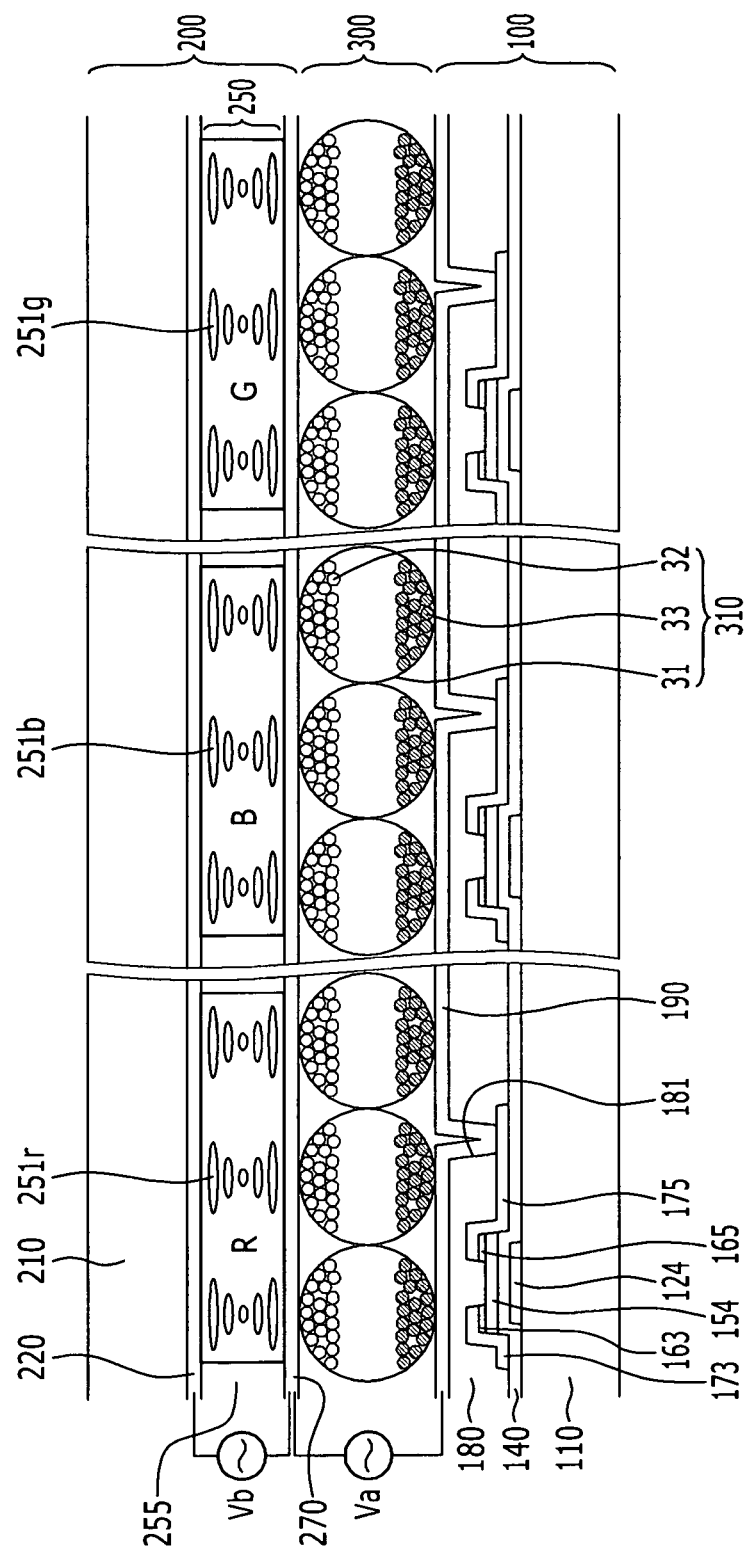
FIG. 1 illustrates a cross-sectional view of an electro phoretic display according to an exemplary embodiment.

Korean Patent Application No. 10-2010-0076096, filed on Aug. 6, 2010, in the Korean Intellectual Property Office, and entitled: "Electro Phoretic Display and Driving Method Thereof," is incorporated by reference herein in its entirety.

The present invention will be described more fully hereinafter with reference to the accompanying drawings, in which exemplary embodiments are shown. As those skilled in the art would realize, the described embodiments may be modified in various different ways, all without departing from the spirit or scope of the present invention.

Further, in the exemplary embodiments, like reference numerals designate like elements throughout the specification representatively in a first exemplary embodiment and only elements other than those of the first exemplary embodiment will be described.

The drawings and description are to be regarded as illustrative in nature and not restrictive. Like reference numerals designate like elements throughout the specification.

In addition, the size and thickness of each component shown in the drawings are arbitrarily shown for understanding and ease of description, but the embodiments are not limited thereto.

In the drawings, the thickness of layers, films, panels, regions, etc., are exaggerated for clarity. In the drawings, for understanding and ease of description, the thicknesses of some layers and areas are exaggerated. It will be understood that when an element such as a layer, film, region, or substrate is referred to as being "on" another element, it can be directly on the other element or intervening elements may also be present.

An electro phoretic display according to an exemplary embodiment will be described in more detail with reference to FIG. 1. FIG. 1 illustrates a cross-sectional view of an electro phoretic display according to an exemplary embodiment.

As shown in FIG. 1, the electro phoretic display according to an exemplary embodiment includes a lower display panel 100 including a lower substrate 110 and a first pixel electrode 190 formed on the lower substrate 110, an electronic ink layer 300 that is disposed on the lower display panel 100 and includes a plurality of electronic inks 310, and a common electrode 270, a liquid crystal layer 250, a second pixel electrode 220, and an upper substrate 210 that are sequentially disposed on the electronic ink layer 300.

Hereinafter, the detailed structure of the lower display panel 100 of the electro phoretic display according to an exemplary embodiment is described in more detail with reference to FIG. 1.

As shown in FIG. 1, the lower display panel 100 of the electro phoretic display according to an exemplary embodiment includes a gate electrode 124 formed on the lower substrate 110 and is made of, e.g., transparent glass, plastic, etc. The gate electrode 124 may be connected to a gate line (not shown) that transmits a gate signal thereto.

A gate insulating layer 140 made of, e.g., a silicon nitride (SiNx), a silicon oxide (SiOx), a combination thereof, etc. may be disposed on the gate electrode 124.

A semiconductor layer 154 made of, e.g., hydrogenated amorphous silicon (the abbreviation of the hydrogenated amorphous silicon is a-Si), polysilicon, a combination thereof, etc. may be disposed on the gate insulating layer 140. The semiconductor layer 154 may be disposed on the gate electrode 124, e.g., the semiconductor layer 154 may overlap the gate electrode 124.

Ohmic contacts 163 and 165 may be formed on the semiconductor layer 154. The ohmic contacts 163 and 165 may be made of a material, such as, e.g., n+ hydrogenated amorphous silicon doped with high-concentration n-type impurities, such as phosphorous, or silicide. The ohmic contacts 163 and 165 may be disposed in a pair on the semiconductor layer 154, e.g., the ohmic contacts 163 and 165 may be spaced apart on opposing ends of the semiconductor layer 154.

A drain electrode 175 and a source electrode 173 may be formed on the respective ohmic contacts 163 and 165 and the gate insulating layer 140. The source electrode 173 may be connected to a data line (not shown) that transmits a data signal.

The gate electrode 124, the source electrode 173, and the drain electrode 175 form a thin film transistor (TFT), together with the semiconductor layer 154. A channel of the thin film transistor may be formed at the semiconductor layer 154 between the source electrode 173 and the drain electrode 175.

A passivation layer 180 may be formed on the source electrode 173, the drain electrode 175, and the exposed portion of the semiconductor layer 154. The passivation layer 180 may be made of, e.g., an organic insulating material, and may have a flat surface.

A contact hole 181 that exposes the drain electrode 175 may be formed through the passivation layer 180. The first pixel electrode 190 may be formed on the passivation layer 180, and the first pixel electrode 190 may be disposed in the contact hole 181. The first pixel electrode 190 may be made of, e.g., a transparent conducting material, such as at least one of ITO and IZO, or a reflective metal, such as of aluminum; silver, chromium, or alloys of them.

The first pixel electrode 190 may be physically and electrically connected to the drain electrode 175 and the source electrode 173 via the contact hole 181.

The detailed structure of the electronic ink layer 300 of the electro phoretic display is described in more detail with reference to FIG. 1. The plurality of the electronic inks 310 may be disposed on the electronic ink layer 300. The electronic inks 310, in an exemplary embodiment, may each include a plurality of white positive charged particles 32 and a plurality of black negative charged particles 33 disposed in a spherical microcapsule 31. Embodiments are not limited to this arrangement, e.g., the electronic inks 310 may include a plurality of white negative charged particles and a plurality of black positive charged particles.

The microcapsule 31 may be a micro-sized capsule filled with, e.g., a solvent consisting of an isopropyl alcohol (IPA), and the like. The white positive charged particles 32 may be made of, e.g., a nano-sized titanium dioxide-based white pigment. The black negative charged particles 33 may be made of, e.g., nano-sized carbon-based black pigment.

The electronic ink 310 may include black fluid in the spherical microcapsule 31, and a plurality of white charged particles may be distributed in the black fluid. In this configuration, the plurality of white charged particles may be charged in positive or negative polarity.

The detailed structure of the upper display panel 200 of the electro phoretic display is described in more detail with reference to FIG. 1. A common electrode 270 made of, e.g., a transparent conducting material, such as at least one of ITO and IZO, may be disposed on the electronic ink layer 300.

The first pixel electrode 190, which is supplied with the first pixel voltage from the drain electrode 175 supplied with the data voltage, generates an electric field, together with the common electrode 270 of the upper display panel 200 that is supplied with the common voltage. In other words, the electric field may be generated between the first pixel electrode 190 and the common electrode 270 by a gray voltage Va that is the difference between the common voltage that is applied to the common electrode 270 and the first pixel voltage that is applied to the first pixel electrode 190.

In an exemplary configuration, the plurality of white positive charged particles 32 and the plurality of black negative charged particles 33 in the electronic ink 310 between two electrodes 190 and 270 are moved to electrodes having opposite polarities, respectively, to form an image. For example, when the first pixel voltage is lower than the voltage the common electrode 270 applied to the first pixel electrode 190, the white positive charged particles 32 may move upward. Such that the white positive charged particles 32 reflect light, thereby showing white. When the first pixel voltage is lower than common voltage applied to the first pixel electrode 190, the black negative charged particles 33 may move upward. Such that the black negative charged particles 33 absorb light, thereby showing black.

The cholesteric liquid crystal layer 250 is formed on, e.g., directly on, the common electrode 270. The cholesteric liquid crystal layer 250 may be composed of, e.g., a barrier rib 255 that divides the liquid crystal layer into a red pixel (R), a blue pixel (B), and a green pixel (G); a red cholesteric liquid crystal 251r; a blue cholesteric liquid crystal 251b; and a green cholesteric liquid crystal 251g, which are formed at the positions corresponding to pixels, respectively. As such, the barrier rib 255 may divide the liquid crystal layer into a plurality liquid crystal layer segments. Each segment of the liquid crystal layer may correspond to one pixel, and the segments of the liquid crystal layers may be separated by the barrier rib 255.

The red cholesteric liquid crystal 251r, the blue cholesteric liquid crystal 251b, and the green cholesteric liquid crystal 251g have at least two stable states of a planar state and a focal conic state, and are capable of maintaining the two stable states without constant voltage being supplied from the outside. The red cholesteric liquid crystal 251r, the blue cholesteric liquid crystal 251b, and the green cholesteric liquid crystal 251g may have a helical structure, e.g., a spiral form that winds around a fixed center axis. The liquid crystals 251r, 251b, and 251g are capable of reflecting light having a specific wavelength, in accordance with a helical pitch in a planar state, while the helical axis is capable of being arranged in parallel with the surface of the upper substrate 210, such that light is transmitted.

The red cholesteric liquid crystal 251r may have a helical pitch that reflects light of 590 nm to 750 nm wavelength, e.g., a red wavelength, and implements red in a planar state. The blue cholesteric liquid crystal 251b may have a helical pitch that reflects light of 400 nm to 480 nm wavelength, e.g., a blue wavelength, and implements blue in a planar state. The green cholesteric liquid crystal 251g may have a helical pitch that reflects light of 500 nm to 560 nm wavelength, e.g., a green wavelength, and implements green in a planar state.

The second pixel electrode 220 may be composed of a transparent conducting material, e.g., at least one of ITO and IZO, and may be formed on, e.g., directly on, the cholesteric liquid crystal layer 250. A color voltage Vb that is a difference between the common voltage supplied to the common electrode 270 and the second pixel voltage supplied to the second pixel electrode 220 may be supplied between the common voltage and the second pixel electrode 220, such that the colors of the cholesteric liquid crystal may be implemented.

As described above, in an exemplary embodiment, the first pixel electrode 190 and common electrode 270 are formed on and under the pixel electronic ink layer 300, respectively, the cholesteric liquid crystal layer 250 and the second pixel electrode 220 are formed on the common electrode 270. As such it is possible to change reflectivity of the cholesteric liquid crystal and the electronic ink layer 300, and improve contrast ratio and chroma of the color electro phoretic display, by adjusting gray voltage Va and color voltage Vb. In particular, it is possible to improve the reflectivity, contrast ratio, and chroma of the color electro phoretic display by reducing reflectivity for black when implementing black.

Hereinafter, a driving method for the electro phoretic display according to the first exemplary embodiment to implement white, black, red, green and is described in more detail with reference to FIGS. 2-6.

Figure 2:
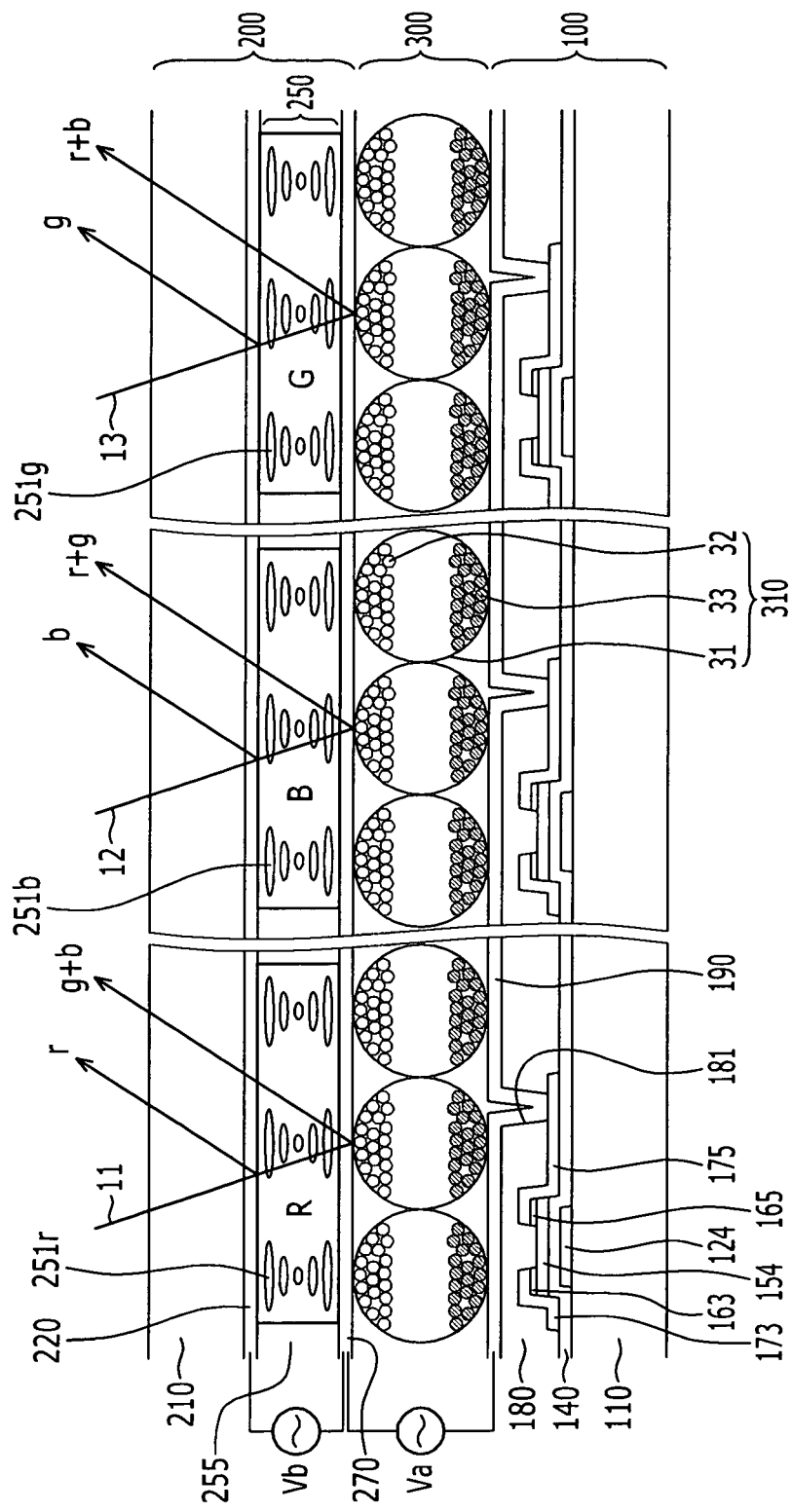
FIG. 2 illustrates a cross-sectional view showing a step of implementing white in the electro phoretic display of FIG. 1.
Figure 3:
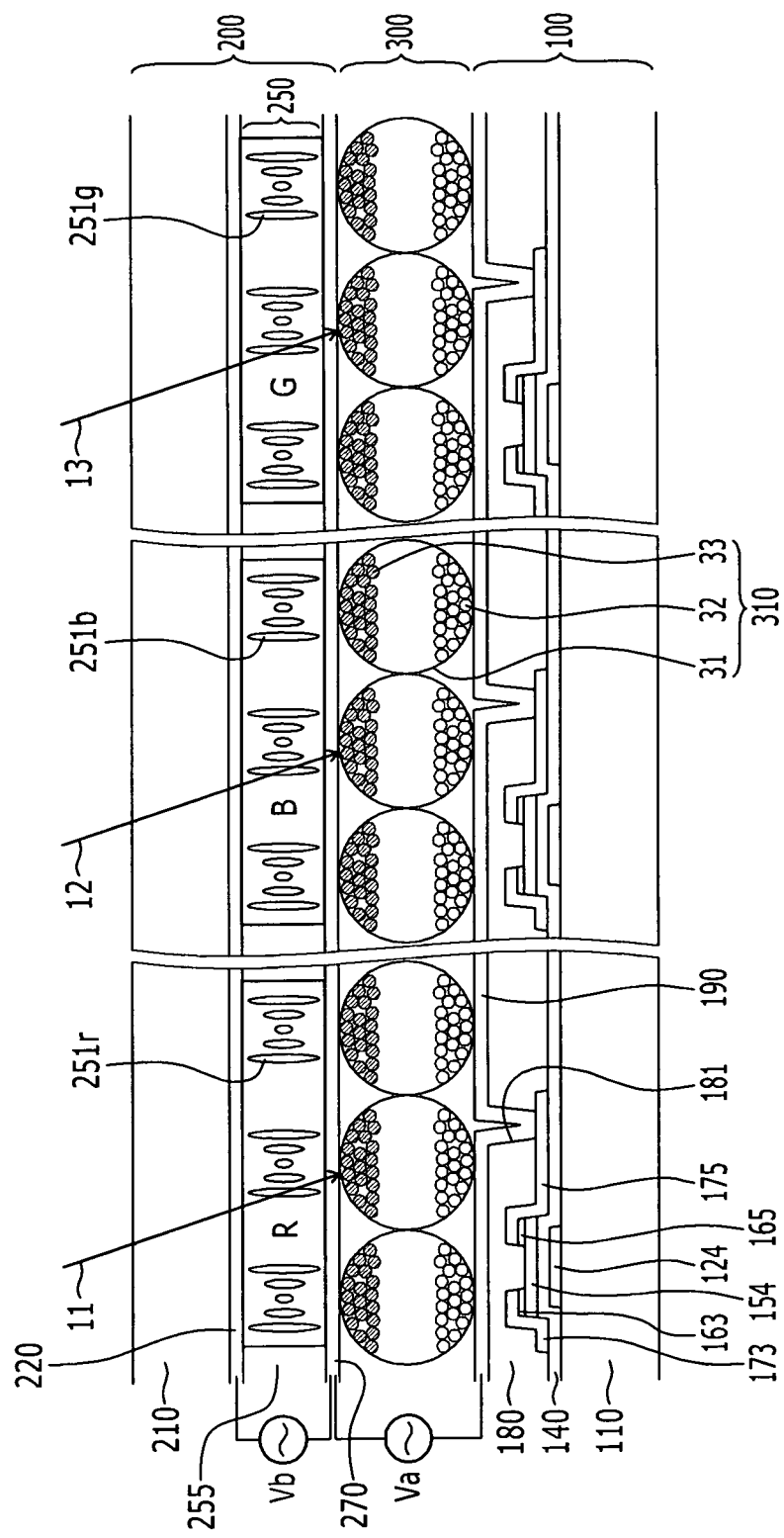
FIG. 3 illustrates a cross-sectional view showing a step of implementing black in the electro phoretic display of FIG. 1.
Figure 4:
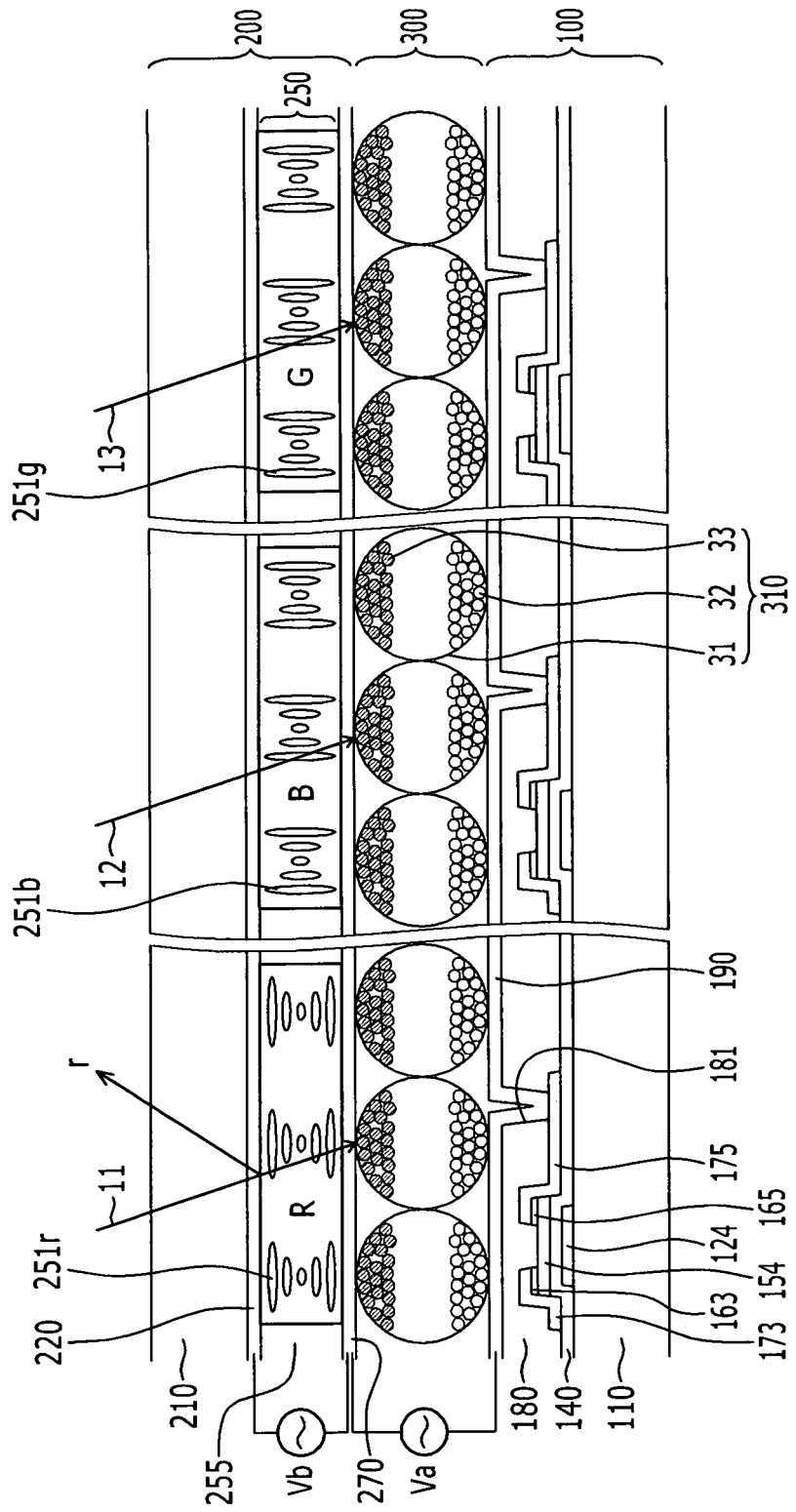
FIG. 4 illustrates a cross-sectional view showing a step of implementing red in the electro phoretic display of FIG. 1.
Figure 5:
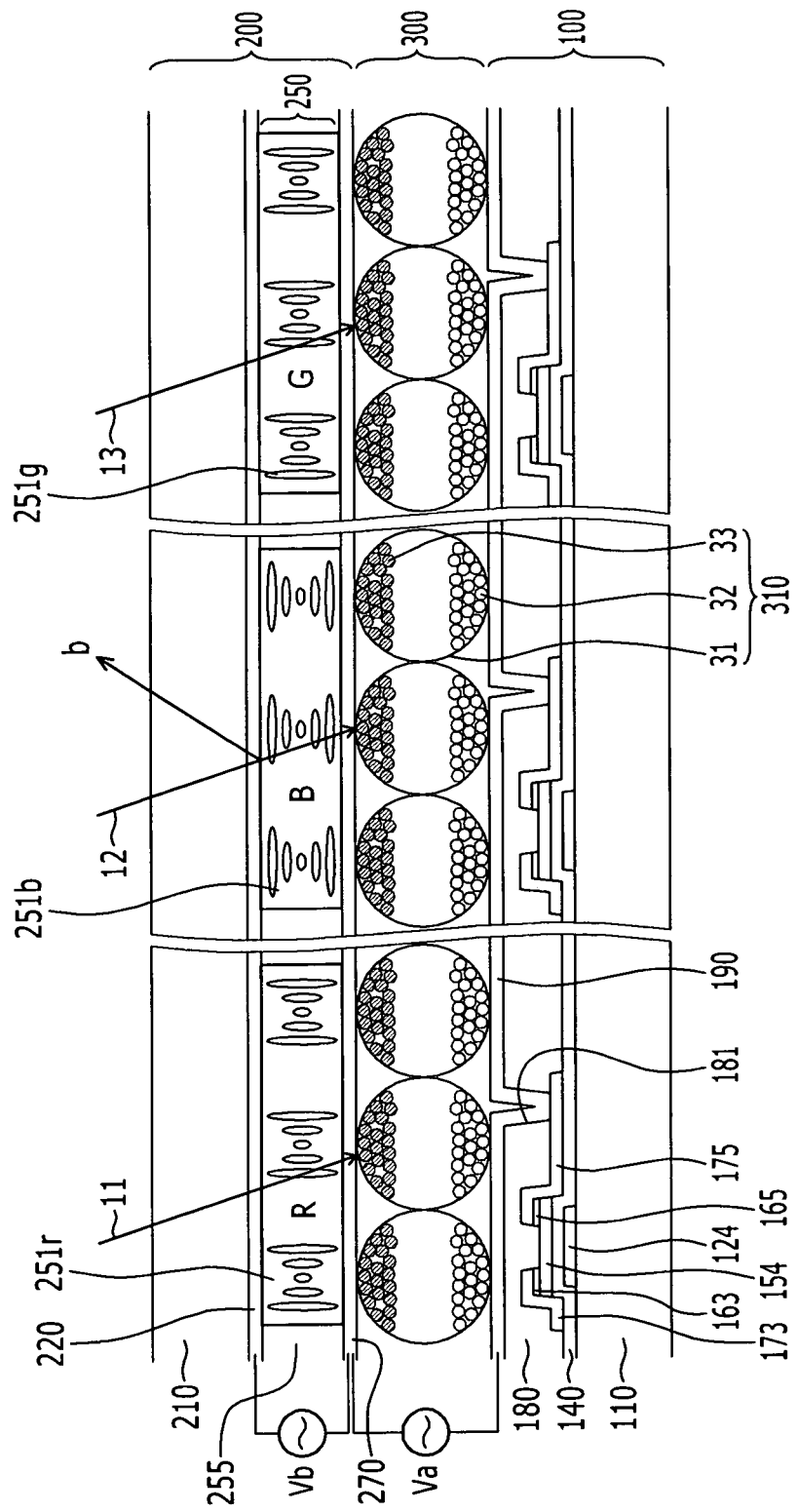
FIG. 5 illustrates a cross-sectional view showing a step of implementing blue in the electro phoretic display of FIG. 1.
Figure 6:
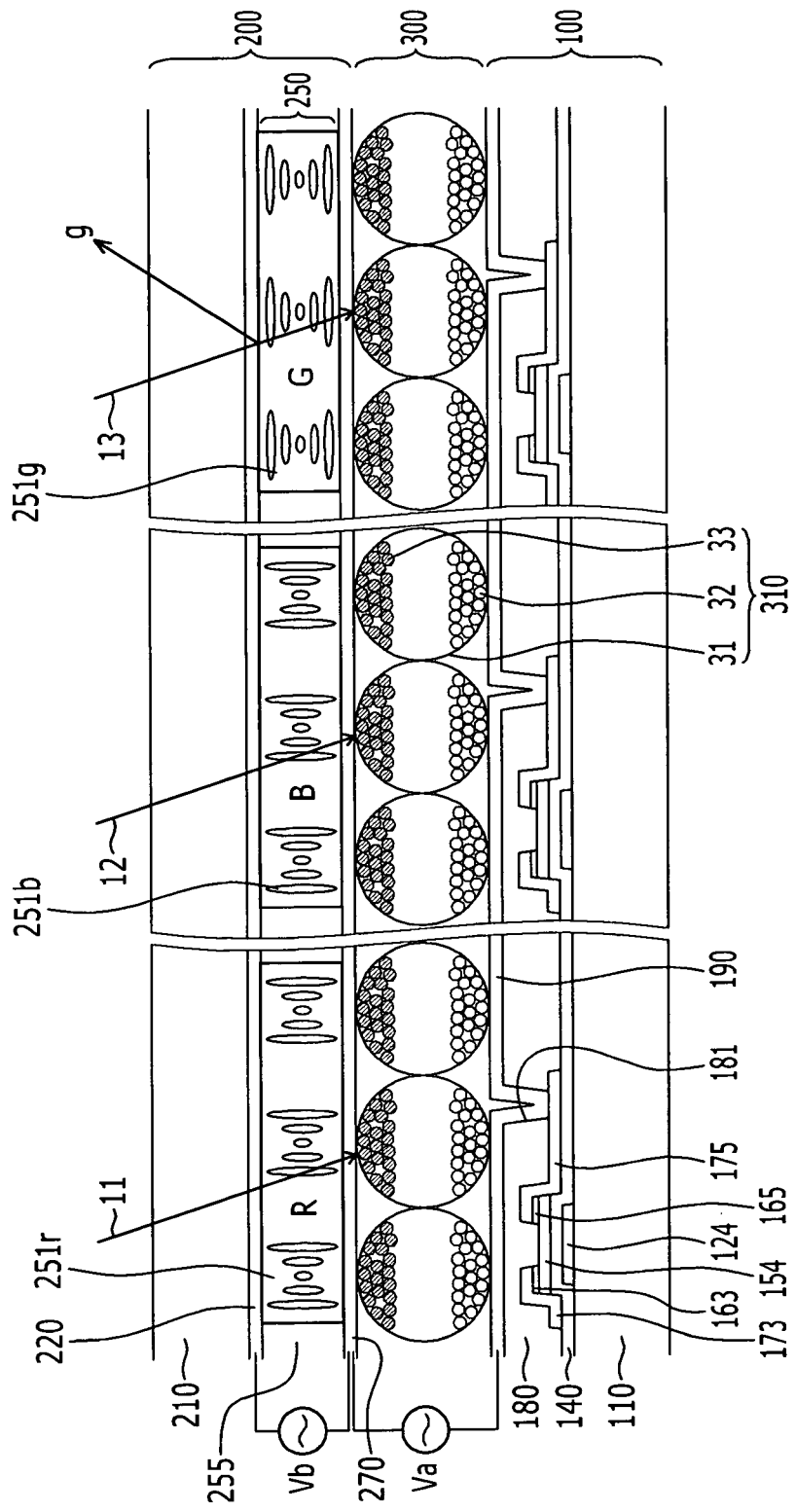
FIG. 6 illustrates a cross-sectional view showing a step of implementing green in the electro phoretic display of FIG. 1.

FIG. 2 is a cross-sectional view showing a step of implementing white in the electro phoretic display of FIG. 1. FIG. 3 is a cross-sectional view showing a step of implementing black in the electro phoretic display of FIG. 1. FIG. 4 is a cross-sectional view showing a step of implementing red in the electro phoretic display of FIG. 1. FIG. 5 is a cross-sectional view showing a step of implementing blue in the electro phoretic display of FIG. 1. FIG. 6 is a cross-sectional view showing a step of implementing green in the electro phoretic display of FIG. 1.

First, a driving method for the electro phoretic display according to an exemplary embodiment for implementing white is described. As shown in FIG. 2, the electro phoretic display may apply the gray voltage Va between the first pixel electrode 190 and the common electrode 270, such that the first pixel voltage applied to the first pixel electrode 190 of the red pixel (R), the blue pixel (B), and the green pixel (G) is higher than the common voltage applied to the common electrode 270. In this case, the white positive charged particles 32 of the red (R), blue (B), and green (G) pixels may move upward, e.g., toward the common electrode 270. Further, the color voltage Vb may be applied between the common electrode 270 and the second pixel electrode 220, such that the common voltage applied to the common electrode 270 is the same as the second pixel voltage applied to the second pixel electrode 220 of the red (R), blue (B), and green (G) pixels. In this case, the red cholesteric liquid crystal 251r, the blue cholesteric liquid crystal 251b, and the green cholesteric liquid crystal 251g of the cholesteric liquid crystal layer 250 are maintained in the planar state. For example, it is possible to set the first pixel voltage at 15V, and the common voltage and the second pixel voltage at 0V.

As shown in FIG. 2, incident external lights 11, 12, and 13 may be directed toward the red cholesteric liquid crystal 251r, the blue cholesteric liquid crystal 251b and the green cholesteric liquid crystal 251g, respectively, in the planar state. A light r having the red wavelength may be reflected from the red cholesteric liquid crystal 251r in the planar state. A light b having the blue wavelength may be reflected from the blue cholesteric liquid crystal 251b in the planar state, and the light g having the green wavelength is reflected from the green cholesteric liquid crystal 251g. Further, the light b having the blue wavelength and the light g having the green wavelength passing through the red cholesteric liquid crystal 251r may be reflected by the white positive charged particles 32 of the electronic ink layer 300 thereunder. The light r having the red wavelength and the light g having the green wavelength passing through the blue cholesteric liquid crystal 251b may be reflected by the white positive charged particles 32 of the electronic ink layer 300 thereunder. The light r having the red wavelength and the light b having the blue wavelength passing through the green cholesteric liquid crystal 251g may be reflected by the white positive charged particles 32 of the electronic ink layer 300 thereunder. Therefore, the light r having the red wavelength, the light b having the blue wavelength, and the light g having the green wavelength may be reflected from the pixels without loss of light may be mixed to implement white, such that the reflectivity can be improved, e.g., in comparison to using a color filter.

Next, the driving method for implementing black is described. As shown in FIG. 3, the electro phoretic display according to an exemplary embodiment may apply the gray voltage Va between the first pixel electrode 190 and the common electrode 270, such that the first pixel voltage applied to the first pixel electrode 190 of the red pixel (R), the blue pixel (B), and the green pixel (G) is lower than the common voltage applied to the common electrode 270. In this case, the black negative charged particles 33 may move upward, e.g., toward the common electrode 270. Further, the color voltage Vb may be applied between the second pixel electrode 220 and the common electrode 270, such that the second pixel voltage applied to the second pixel electrode 220 of all of the red (R), blue (B), and green (G) pixels is higher than the common voltage applied to the common electrode 270. In this configuration, the red cholesteric liquid crystal 251r, the blue cholesteric liquid crystal 251b, and the green cholesteric liquid crystal 251g of the cholesteric liquid crystal layer 250 are maintained in the focal conic state. For example, it is possible to set the first pixel voltage at 15V, the common voltage at 0V, and the second pixel voltage at 20V.

As shown in FIG. 3, the incident external lights 11, 12, and 13 may be directed toward the red cholesteric liquid crystal 251r, the blue cholesteric liquid crystal 251b, and the green cholesteric liquid crystal 251g, respectively, in the focal conic state. The incident external lights 11, 12, and 13 may pass through the red cholesteric liquid crystal 251r, the blue cholesteric liquid crystal 251b, and the green cholesteric liquid crystal 251g, respectively. Further, the external light passing trough the red cholesteric liquid crystal 251r, the blue cholesteric liquid crystal 251b, and the green cholesteric liquid crystal 251g may be absorbed into the black negative charged particles 33 of the electronic ink layer 300 thereunder. Therefore, all of the red (R), blue (B), and green (G) pixels implement black.

As described above, the red cholesteric liquid crystal 251r, the blue cholesteric liquid crystal 251b, and the green cholesteric liquid crystal 251g transmit and do not absorb the external light in the focal conic state, such that black can be implemented, and the contrast ratio can be improved without light loss.

Next, a driving method of implementing red is described. As shown in FIG. 4, the electro phoretic display according to an exemplary embodiment may apply the gray voltage Va between the first pixel electrode 190 and the common electrode 270, such that the first pixel voltage applied to the first pixel electrode 190 of the red pixel (R), the blue pixel (B), and the green pixel (G) is lower than the common voltage applied to the common electrode 270. In this case, the black negative charged particles 33 may move upward, e.g., toward the common electrode 270. Further, the color voltage Vb is applied between the second pixel electrode 220 and the common electrode 270 of the red pixel (R), such that the second pixel voltage applied to the second pixel electrode 220 of the red pixel (R) is the same as the common voltage applied to the common electrode 270. The color voltage Vb may be applied, e.g., simultaneously applied, between the second pixel electrode 220 and the common electrode 270, such that the second pixel voltage applied to the second pixel electrode 220 of the blue pixel (B) and the green pixel (G) is higher than the common voltage applied to the common electrode 270. In this case, the red cholesteric liquid crystal 251r may maintain the planar state, and the blue cholesteric liquid crystal 251b and the green cholesteric liquid crystal 251g may maintain the focal conic state. For example, it is possible to set the first pixel voltage at 15V, to set the common voltage at 0V for all the pixels, the second pixel voltage of the red pixel (R) at 0V, the second pixel voltage of the blue pixel (B) and the green pixel (G) at 20V.

Accordingly, as shown in FIG. 4, the incident external light 11 may be directed toward the red cholesteric liquid crystal 251r that is in the planar state, and the light (r) of the red wavelength may be reflected from the red cholesteric liquid crystal 251r, and the light of the blue wavelength (b) and the green wavelength (g) may pass through the red cholesteric liquid crystal 251r and may be absorbed by the black negative charged particles 33 thereunder.

Further, the incident external lights 12 and 13 may be directed toward the respective blue cholesteric liquid crystal 251b and the green cholesteric liquid crystal 251g, which are in the focal conic state, and may pass through the respective blue cholesteric liquid crystal 251b and the green cholesteric liquid crystal 251. Further, the external light passing through the blue cholesteric liquid crystal 251b and the green cholesteric liquid crystal 251g may be absorbed into the black negative charged particles 33 of the electronic ink layer 300 thereunder. Therefore, the red pixel (R) implements red, and the blue pixel (B) and the green pixel (G) implement black, such that the red can be clearly implemented, and the contrast ratio and the chroma can be improved.

Next, a driving method of implementing blue is described. As shown in FIG. 5, the electro phoretic display according to an exemplary embodiment moves the black negative charged particles 33 of the electronic ink upward, e.g., toward the common electrode 270. Further, the color voltage Vb may be applied between the second pixel electrode 220 and the common electrode 270 of the blue pixel (B), such that the second pixel voltage applied to the second pixel electrode 220 of the blue pixel (B) is the same as the common voltage applied to the common electrode 270. The color voltage Vb may be applied, e.g., simultaneously applied, between the second pixel electrode 220 and the common electrode 270, such that the second pixel voltage applied to the second pixel electrode 220 of the red pixel (R) and the green pixel (G) is higher than the common voltage applied to the common electrode 270.

As shown in FIG. 5, the incident external light 12 may be directed toward the blue cholesteric liquid crystal 251b that is in the planar state, and the light (b) of blue wavelength may be reflected from the blue cholesteric liquid crystal 251b. The light (r) and (g) of the respective red and green wavelengths may pass through the blue cholesteric liquid crystal 251b and may be absorbed into the black negative charged particles 33 of the electronic ink layer 300 thereunder.

Further, the incident external lights 11 and 13 directed toward the respective red cholesteric liquid crystal 251r and green cholesteric liquid crystal 251g, which are in the focal conic state, may be absorbed into the black negative charged particles 33, after passing through the red cholesteric liquid crystal 251r and the green cholesteric liquid crystal 251g thereunder. Since the blue pixel (B) implements blue, and the red pixel (R) and the green pixel (G) implement black, blue can be clearly implemented, and the contrast ratio and chroma can be improved.

Next, a driving method of implementing green is described. As shown in FIG. 6, the electro phoretic display according to an exemplary embodiment moves the black negative charged particles 33 of the electronic ink 310, e.g., move the particles 33 upward toward the common electrode 270. Further, the color voltage Vb may be applied between the second pixel electrode 220 and the common electrode 270 of the red pixel (G), such that the second voltage applied to the second pixel electrode 220 of the green pixel G is the same as the common voltage applied to the common electrode 270. The color voltage Vb may be applied, e.g., simultaneously applied, between the second pixel electrode 220 and the common electrode 270, such that the second pixel voltage applied to the second pixel electrode 220 of the red pixel (R) and the blue pixel (B) is higher than the common voltage applied to the common electrode 270.

As shown in FIG. 6, the incident external light 13 may be directed toward the green cholesteric liquid crystal 251g that is in the planar state, and the light (g) of green wavelength may be reflected from the green cholesteric liquid crystal 251g. The light (r) and (b) of respective red wavelength and blue wavelength may pass through the green cholesteric liquid crystal 251g and may be absorbed into the black negative charged particles 33 of the electronic ink layer 300 thereunder.

Further, the incident external lights 11 and 12 may be directed toward the respective red cholesteric liquid crystal 251r and blue cholesteric liquid crystal 251b, which are in the focal conic state, and may be absorbed into the black negative charged particle 33 of the electronic ink layer 300 thereunder after passing through the respective red cholesteric liquid crystal 251r and the blue cholesteric liquid crystal 251b.

Since the green pixel (G) implements green, and the red pixel (R) and the blue pixel (B) implement black, green can be clearly implemented, and the contrast ratio and the chroma can be improved.

The following Table 1 compares the electro phoretic display according to an exemplary embodiment discussed above in relation to FIGS. 1-6 with Comparative Example 1 and Comparative Example 2.

TABLE 1

| Measured Property | Comparative Example 1 | Comparative Example 2 | Exemplary Embodiment |
|---|---|---|---|
| reflectivity (%) | 42.6 | 10-15 | 40 |
| contrast ratio | 6 | 6 or less | 6 |
| color reproducibility (%) | 0 | 30 | 30 |
| white CIE color coordinate | (0.310, 0.333) | (0.310, 0.333) | (0.310, 0.333) |

Comparative Example 1 is a black-and-white electro phoretic display of the related art, and Comparative Example 2 is an electro phoretic display equipped with a color filter.

As shown in Table 1, the electro phoretic display according to the Exemplary embodiment has the same reflectivity as the black-and-white electro phoretic display, and the same color reproducibility as the electro phoretic display equipped with a color filter.

Although it is exemplified above that the method of driving the electro phoretic display uses electronic ink 310 having white positive charged particles 31 and black negative charged particles 33, it would be obvious to a person of ordinary skill in the art to modify the method of driving the electro phoretic display to use, e.g., electronic ink 310 having white negative charged particles and black positive charged particles. It would be obvious to a person of ordinary skill in the art to modify the method of driving electro phoretic display to use, e.g., electronic ink that includes microcapsule, a black fluid disposed in the microcapsule, and a plurality of white charged particles distributed in the black fluid.

Hereinafter, an electro phoretic display according to an exemplary embodiment is described with reference to FIG. 7. The cholesteric liquid crystal layer 250 may include the red cholesteric liquid crystal 251r, the blue cholesteric liquid crystal 251b, and the green cholesteric liquid crystal 251g formed inside the barrier rib 255. For example, the cholesteric liquid crystals 251r, 251b, and 251g may formed in cholesteric liquid crystal capsules.

Figure 7:
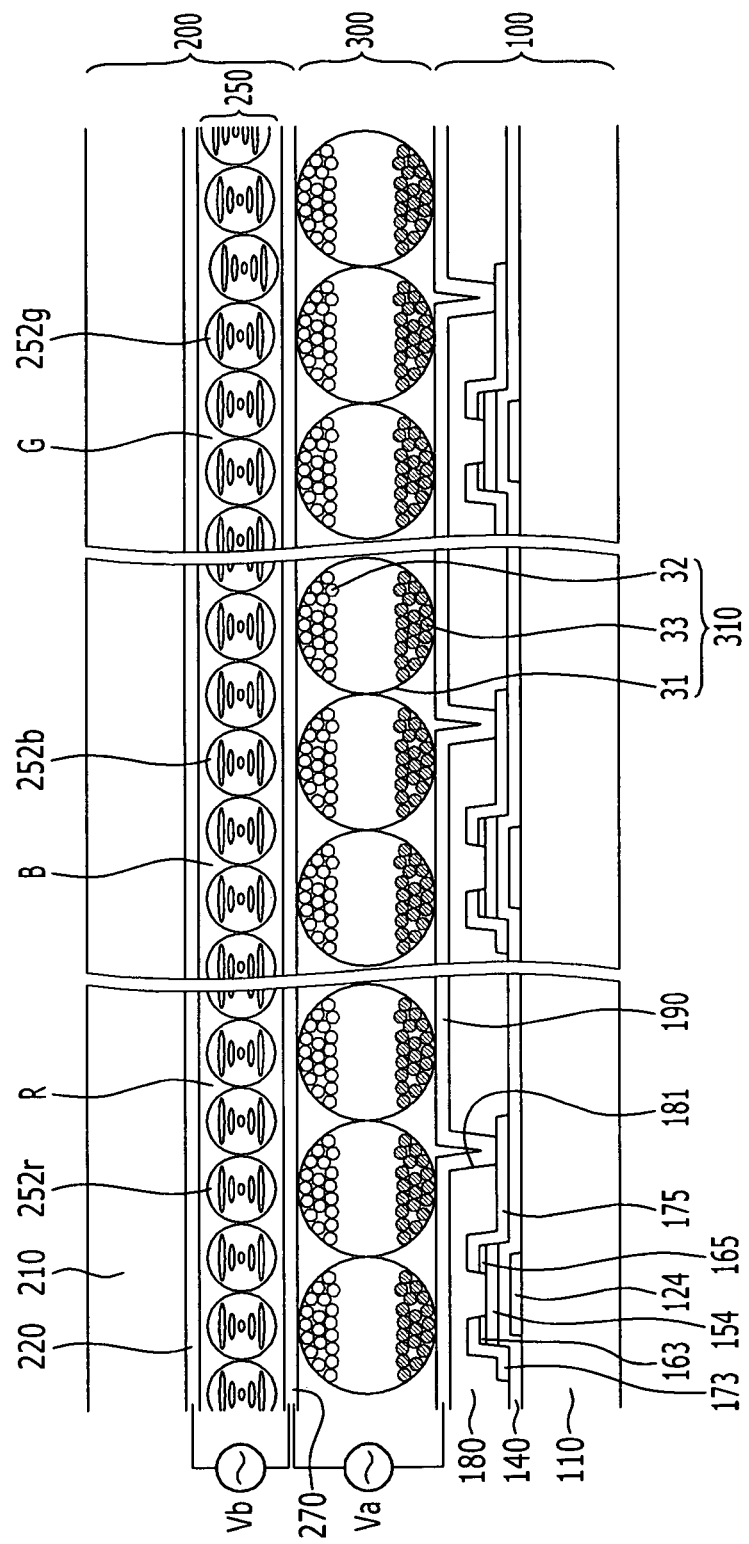
FIG. 7 illustrates a cross-sectional view of an electro phoretic display according to an exemplary embodiment.

FIG. 7 is a cross-sectional view of an electro phoretic display according to an exemplary embodiment that is substantially the same as the exemplary embodiment shown in FIG. 1, and repeated descriptions are not provided.

As shown in FIG. 7, a cholesteric liquid crystal layer 250 may be formed on the common electrode 270. The cholesteric liquid crystal layer 250 may be composed of a red cholesteric liquid crystal capsule 252r, a blue cholesteric liquid crystal capsule 252b, and a green cholesteric liquid crystal capsule 252g, which are formed at positions corresponding to each pixel.

The red cholesteric liquid crystal capsule 252r is capable of implementing red in the planar state, the blue cholesteric liquid crystal capsule 252b is capable of implementing blue in the planar state, and the green cholesteric liquid crystal capsule 252g is capable of implementing green in the planar state.

As described above, first pixel electrode 190 and common electrode 270 may be formed on and under the electronic ink layer 300, respectively. A cholesteric liquid crystal layer 250 composed of the red cholesteric liquid crystal capsule 252r, the blue cholesteric liquid crystal capsule 252b, and the green cholesteric liquid crystal capsule 252g, and a second pixel electrode 220 are formed on a common electrode 270. According to this exemplary embodiment, it is possible to improve reflectivity, contrast ratio, and chroma of the color electro phoretic display by adjusting gray voltage Va and color voltage Vb to change reflectivity of the cholesteric liquid crystal layer and of the electronic ink layer 300. Further, since the cholesteric liquid crystal layer 250 composed of the red cholesteric liquid crystal capsule 252r, the blue cholesteric liquid crystal capsule 252b, and the green cholesteric liquid crystal capsule 252g has the cholesteric liquid crystal surrounded by the liquid crystal capsule, it is possible to minimize image distortion when the electro phoretic display bends and/or pressure is applied to the surface of the electro phoretic display.

Hereinafter, an electro phoretic display according to an exemplary embodiment is described with reference to FIG. 8. The liquid crystal layer 250 may include liquid molecules having a specific color disposed between the common electrode 270 and the second pixel electrode 220.

Figure 8:
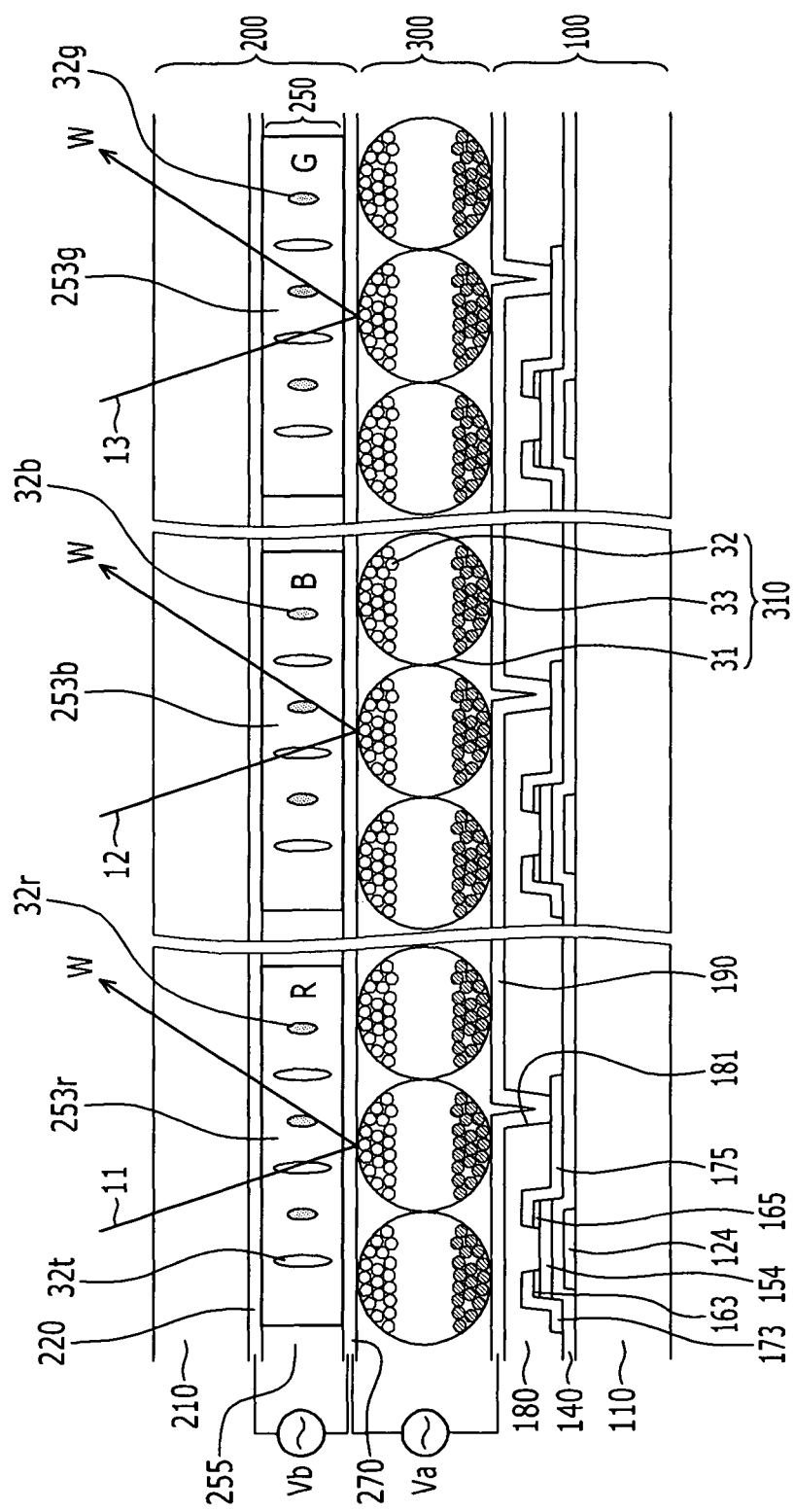
FIG. 8 illustrates a cross-sectional view of an electro phoretic display, according to an exemplary embodiment, showing a step of implementing white.

FIG. 8 is a cross-sectional view of an electro phoretic display according to an exemplary embodiment that is substantially the same as the first exemplary embodiment shown in FIG. 1, and repeated descriptions are not provided.

As shown in FIG. 8, a liquid crystal layer 250 may be formed on a common electrode 270, the liquid crystal layer 250 may be composed of a barrier rib 255 dividing a red pixel (R), a blue pixel (B) and a green pixel (G), and a red liquid crystal layer 253r, a blue liquid crystal layer 253b, and a green liquid crystal layer 253g.

The red liquid crystal layer 253r, the blue liquid crystal layer 253b, and the green liquid crystal layer 253g may be liquid crystal layers in, e.g., an ECB (electrically controlled birefringence) mode, a TN (Twisted Nematic) mode, a VA (Vertical Aligned) mode, a PNLC (Polymer Network Liquid Crystal) mode, or a PDLC (Polymer Dispersed Liquid Crystal) mode. A liquid crystal layer in PDLC mode is exemplified in the exemplary embodiment shown in FIG. 8.

The liquid crystal layer 250 in the PDLC mode may disperse external light by using liquid crystal molecules irregularly arranged when color voltage Vb is not applied between the common electrode 270 and the second pixel electrode 220. When the color voltage Vb is applied between the common electrode 270 and the second pixel electrode 220, the liquid crystal molecules may be arranged in the electric field direction and transmit the external light.

The red liquid crystal layer 253r includes transparent liquid crystal molecules 32t and red liquid crystal molecules 32r showing red, the blue liquid crystal layer 253b includes transparent liquid crystal molecules 32t and blue liquid crystal molecules 32b showing blue, and the green liquid crystal layer 253g includes transparent liquid crystal molecules 32t and green liquid crystal molecules 32g showing green.

When the color voltage Vb is applied between the common electrode 270 and the second pixel electrode 220, the liquid crystal molecules 32t, 32r, 32b, and 32g are arranged perpendicular to the electric field direction to transmit external light. The transmitted external light may be reflected from white positive charged particles 32 of the underlying electronic ink layer 300, thereby implementing white. When the color voltage Vb is not applied between the common electrode 270 and the second pixel electrode 220, the liquid crystal molecules 32t, 32r, 32b, and 32g may be irregularly arranged to disperse the external light. For example, the specific colored liquid crystal molecules in the liquid crystal layer may disperse light having a specific wavelength, such that the light having the specific wavelength may be absorbed into or reflected from the electronic ink layer 300 thereunder, thereby implementing a specific color.

As described above, the first pixel electrode 190 and the common electrode 270 may be formed on and under the electronic ink layer 300, respectively, and the liquid crystal layer 250 and the second pixel electrode 220, which include specific colored liquid crystal molecules, may be formed under the common electrode 270. Such that it is possible to improve reflectivity, contrast ratio, and chroma of the color electro phoretic display by adjusting gray voltage Va and color voltage Vb to change reflectivity of the liquid crystal layer 250 and the electronic ink layer 300.

Hereinafter, a driving method for the electro phoretic display according to an exemplary embodiment that implements white, black, red, green and blue is described in detail with reference to FIGS. 8 to 12.

Figure 9:
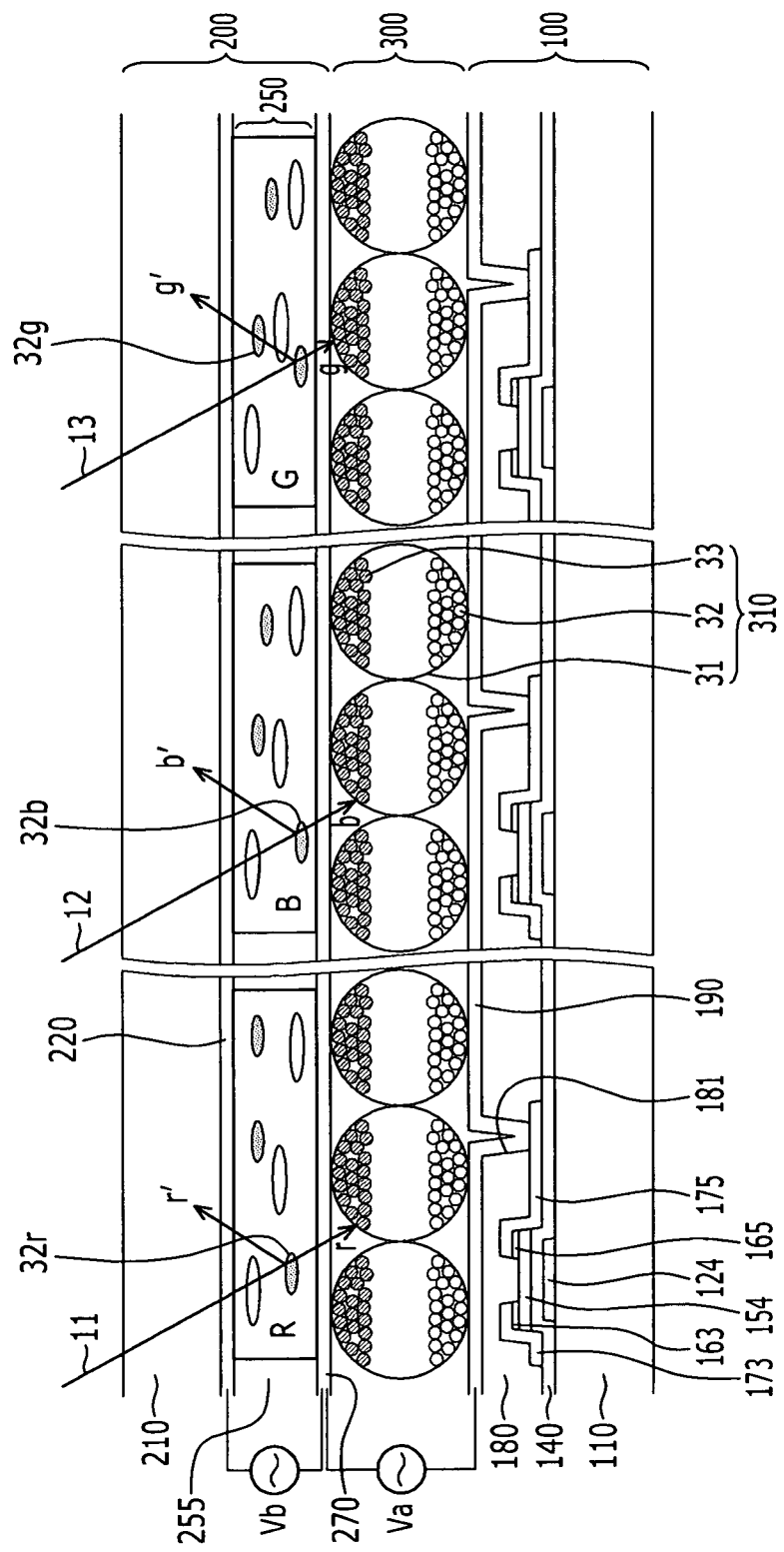
FIG. 9 illustrates a cross-sectional view showing a step of implementing black in the electro phoretic display of FIG. 8.
Figure 10:
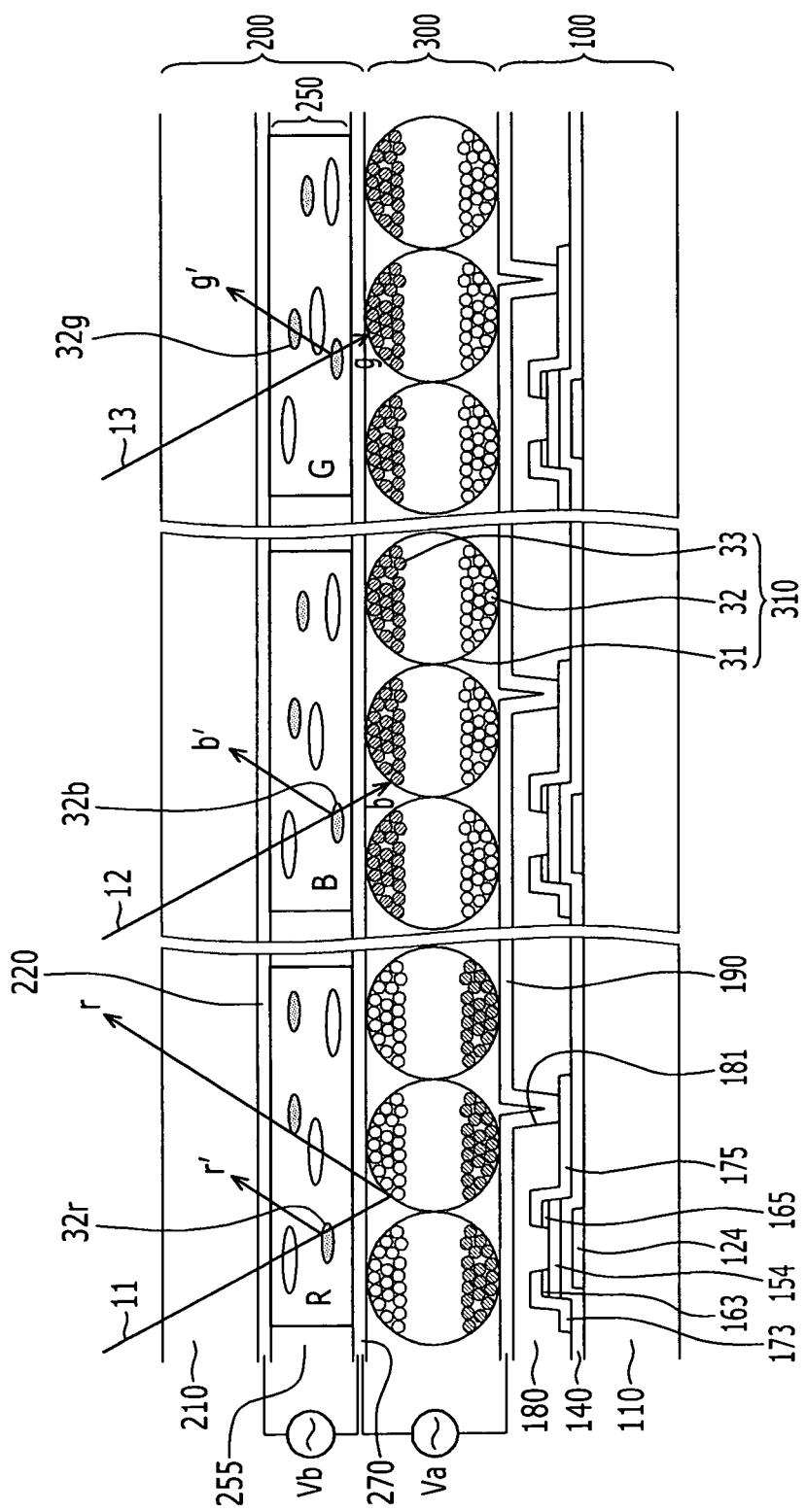
FIG. 10 illustrates a cross-sectional view showing a step of implementing red in the electro phoretic display of FIG. 8.
Figure 11:
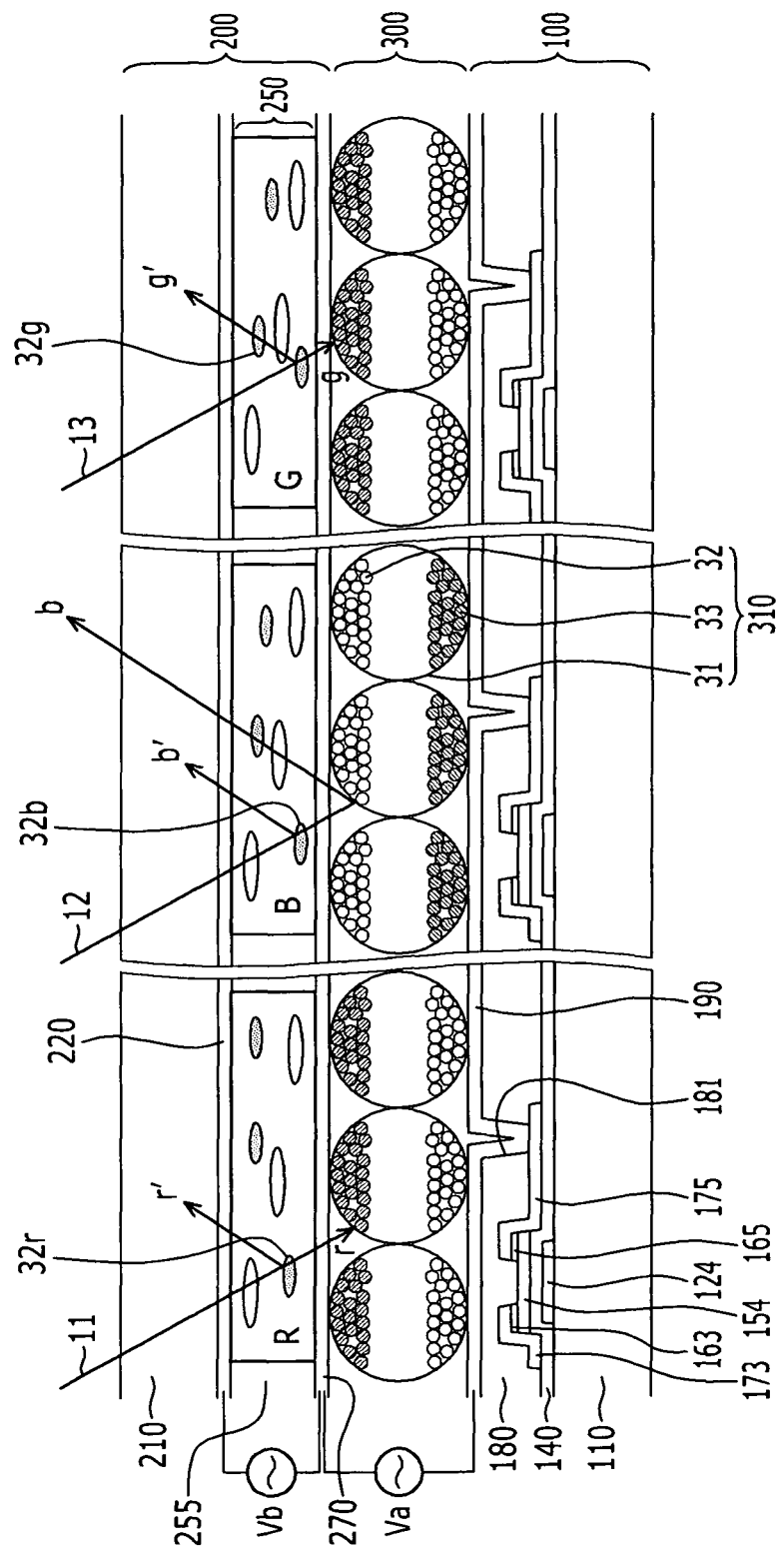
FIG. 11 illustrates a cross-sectional view showing a step of implementing blue in the electro phoretic display of FIG. 8.
Figure 12:
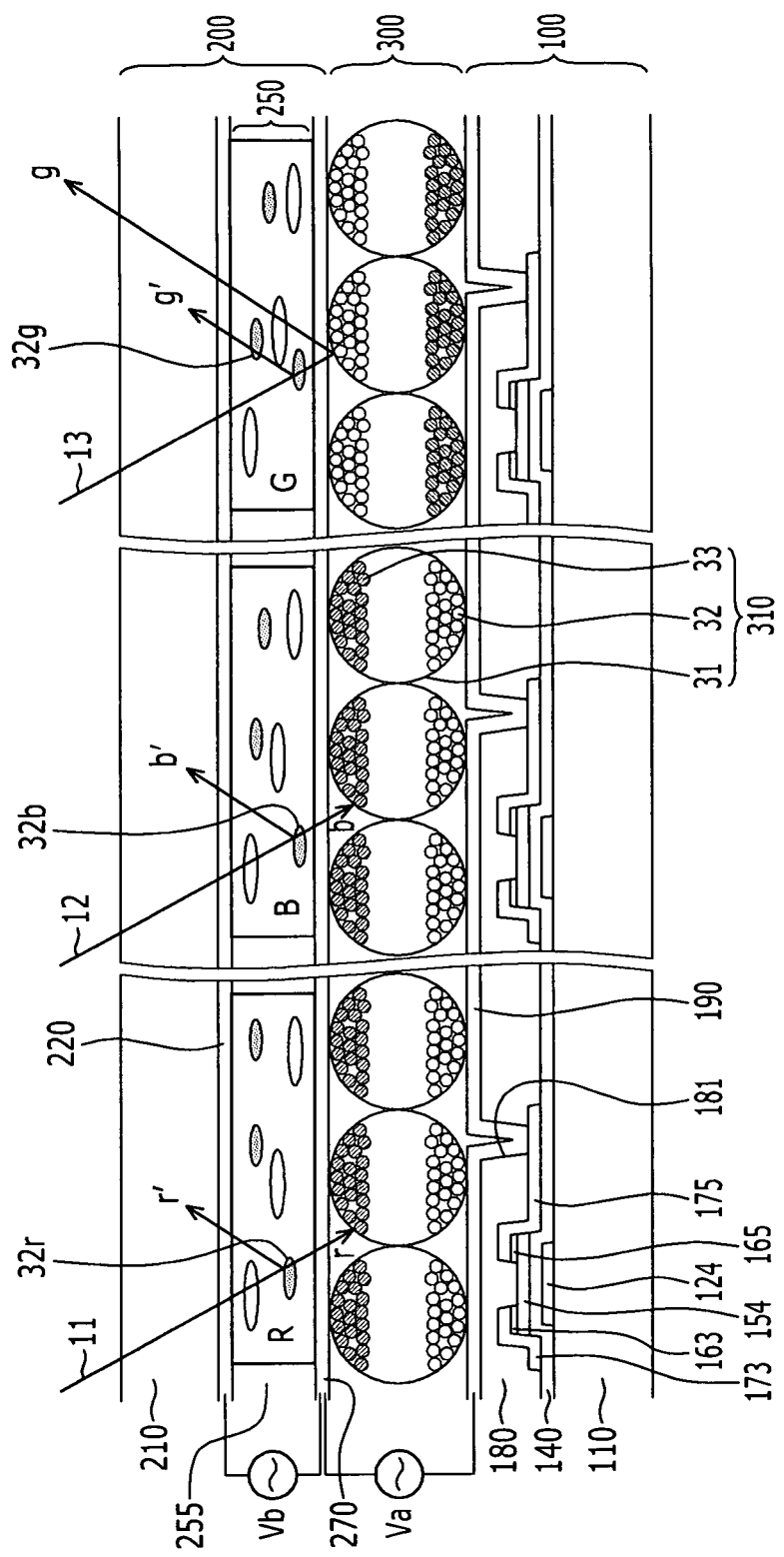
FIG. 12 illustrates a cross-sectional view showing a step of implementing green in the electro phoretic display of FIG. 8.

FIG. 8 is a cross-sectional view of an electro phoretic display according to a first exemplary embodiment, showing a step of implementing white. FIG. 9 is a cross-sectional view showing a step of implementing black in the electro phoretic display of FIG. 8. FIG. 10 is a cross-sectional view showing a step of implementing red in the electro phoretic display of FIG. 8. FIG. 11 is a cross-sectional view showing a step of implementing blue in the electro phoretic display of FIG. 8. FIG. 12 is a cross-sectional view showing a step of implementing green in the electro phoretic display of FIG. 8.

First, a driving method of implementing white in the electro phoretic display according to an exemplary embodiment is described. As shown in FIG. 8, the electro phoretic display may apply the gray voltage Va between the first pixel electrode 190 and the common electrode 270, such that the first pixel voltage applied to the red pixel (R), blue pixel (B) and green pixel (G) is higher than the common voltage applied to the common electrode 270. In this case, the charged particles 32 of all of the red (R), blue (B), and green (G) pixels may move upward, e.g., toward the common electrode 270. Further, the color voltage Vb may be applied between the second pixel electrode 220 and the common electrode 270, such that the second pixel voltage applied to the second pixel electrodes 220 of red (R), blue (B), and green (G) pixels is higher than the common voltage applied to the common electrode 270. In this case, the liquid crystal molecules 32t, 32r, 32b, and 32g of the liquid crystal layer 250 in the PDLC mode may be arranged in the electric field direction. For example, it is possible to set the first pixel voltage at 15V, the common voltage at 0V, and the second pixel voltage at 5V.

As shown in FIG. 8, the incident external lights 11, 12, and 13 may be directed toward the respective red liquid crystal layer 253r, blue liquid crystal layer 253b, and green liquid crystal layer 253g. The incident external lights 11, 12, and 13 may pass through the respective red liquid crystal layer 253r, blue liquid crystal layer 253b, and green liquid crystal layer 253g. The transmitted external lights 11, 12, and 13 may be reflected from the white positive charged particles 32 of the electronic ink layer 300 thereunder, thereby implementing white.

As described above, the external light may pass through the red liquid crystal layer 253r, the blue liquid crystal layer 253b, and the green liquid crystal layer 253g, without loss. Then the external light may be reflected from the white positive charged particles 32 of the electronic ink layer 300 thereunder, thereby implementing white, such that it is possible to improve reflectivity in comparison with using a color filter.

Next, a driving method of implementing black is described. As shown in FIG. 9, the electro phoretic display according to an exemplary embodiment may apply the gray voltage Va between the first pixel electrode 190 and the common electrode 270, such that the first pixel voltage applied to the first pixel electrode 190 of the red pixel (R), blue pixel (B) and green pixel (G) is lower than the common voltage applied to the common electrode 270. In this case, the black negative charged particles 33 of the pixels may move upward, e.g., toward the common electrode 270. The color voltage Vb may be applied between the second pixel electrode 220 and common electrode 270, such that the second pixel voltage applied to the second pixel electrodes 220 of the red (R), the blue (B), and the green (G) pixels is the same as the common voltage applied to the common electrode 270. In this case, the liquid crystal molecules 32t, 32r, 32b, and 32g of the liquid crystal layer 250 in the PDLC mode are irregularly arranged. For example, it is possible to set the first pixel voltage at 15V, the common voltage at 0V and the second pixel voltage at 5V.

As shown in FIG. 9, the incident external lights 11, 12, and 13 may be directed toward the respective red liquid crystal layer 253r, blue liquid crystal layer 253b and green liquid crystal layer 253g. The incident external lights 11, 12, and 13 may be dispersed by the red liquid crystal molecules 32r, the blue liquid crystal molecules 32b, and the green liquid crystal molecules 32g, and most of the light (r, b, and g) having a specific color wavelength is absorbed into the black positive charged particles 33 of the electronic ink layer 300 thereunder, thereby implementing black. The other (r', b', g') of the dispersed light having a specific color wavelength may be reflected to the outside, but the amount is very small and there is little effect.

As described above, the external lights 11, 12, and 13 may be dispersed by the red liquid crystal layer 253r, the blue liquid crystal layer 253b, and the green liquid crystal layer 253g. Most of the light (r, b, g) having a specific color wavelength may be absorbed into the black negative charged particles 33, thereby implementing black. Therefore, it is possible to implement black without light loss in comparison with, e.g., using a color filter, such that it is possible to improve contrast.

Next, a driving method of implementing red is described. As shown in FIG. 10, the electro phoretic display according to an exemplary embodiment may apply the gray voltage Va between the first pixel electrode 190 and the common electrode 270, such that the first pixel electrode applied to the red pixel (R) and the first pixel electrode 190 is higher than the common voltage applied to the common electrode 270. In this case, the white positive charged particles 32 of the red pixel (R) may move upward, e.g. toward the common electrode 270. Further, the gray voltage Va may be applied between the first pixel electrode 190 and the common electrode 270, such that the first pixel voltage applied to the first pixel electrode 190 of the blue pixel (B) and the green pixel (G) is lower than the common voltage applied to the common electrode 270. In this case, the black negative charged particles 33 of the blue pixel (B) and green pixel (G) may move upward.

Further, the color voltage Vb may be applied between the second pixel electrode 220 and the common electrode 270, such that the second pixel voltage applied to the second pixel electrode 220 of all the pixels is the same as the common voltage applied to the common electrode 270. In this case, the liquid crystal molecules 32t, 32r, 32b, and 32g of the liquid crystal layer 250 in the PDLC mode may be irregularly arranged. For example, it is possible to set the first pixel voltage of the red pixel (R) at 15V, and the first pixel voltage of the blue pixel (B) and green pixel (G) at 15V, the common voltage at 0V, and the second pixel voltage of all the pixels at 5V.

As shown in FIG. 10, the incident external light 11 may be directed toward the red liquid crystal layer 253r is dispersed by the red liquid crystal molecules 32r and most light (r) having red wavelength is reflected from the white charged particles 32 of the electronic ink layer 300 thereunder, thereby implementing red. Further, the incident external lights 12 and 13 directed toward the blue liquid crystal layer 253b and the green liquid crystal layer 253g, respectively, may be dispersed by the blue liquid crystal molecules 32b and the green liquid crystal molecules 32g. Such that most of light (b) of blue wavelength and light (g) of green wavelength is absorbed into the black negative charged particles 33 of the electronic ink layer 300 thereunder, thereby implementing black.

Effect of a small amount of light (r', b', g') having a specific color, which is dispersed outside, is very small. As described above, since the red pixel (R) implements red, and the blue pixel (B) and green pixel (G) implement black, red can be clearly implemented, and the contrast ratio and chroma can be improved.

Next, a driving method of implementing blue is described. As shown in FIG. 11, the electro phoretic display according to an exemplary embodiment moves the white charged particles 32 of the blue pixel (B) upward. Further, the black negative charged particles 33 of the red pixel (R) and green pixel (G) are moved upward. Further, the liquid crystal molecules 32t, 32r, 32b, and 32g of the liquid crystal layer 250 in the PDLC mode of all the pixels may be irregularly arranged. Therefore, the incident external light 12 in the blue liquid crystal layer 253b may be dispersed by the blue liquid crystal molecules 32b, and most light (b) of blue wavelength is reflected from the white positive charged particles 32 of the electronic ink layer 300 thereunder, thereby implementing blue. Further, the incident external lights 11 and 12 directed toward the respective red liquid crystal layer 253r and green liquid crystal layer 253g may be dispersed by the respective red liquid crystal molecules 32r and the green liquid crystal molecules 32g. Most of light (r) having red wavelength and light (g) having green wavelength may absorbed into the black negative charged particles 33 of the electronic ink layer 300 thereunder, thereby implementing black.

Effect of a small amount of light (r', b', g') having a specific color, which is dispersed outside, is very small. As described above, since the blue pixel (B) implements blue, and the red pixel (R) and green pixel (G) implement black, blue can be clearly implemented, and the contrast ratio and chroma can be improved.

Next, a driving method of implementing green is described. As shown in FIG. 12, the electro phoretic display according to an exemplary embodiment moves the white positive charged particles 32 of the green pixel (G) upward. Further, the black negative charged particles 33 of the red pixel (R) and blue pixel (B) are moved upward. Further, the liquid crystal molecules 32t, 32r, 32b, and 32g of the liquid crystal layer 250 in the PDLC mode of all the pixels are irregularly arranged. Therefore, the incident external light 13 directed toward the green liquid crystal layer 253g may be dispersed by the green liquid crystal molecules 32g, and most of the light (g) having green wavelength may be reflected from the white positive charged particles 32 of the electronic ink layer 300 thereunder, thereby implementing green. Further, the incident external lights 11 and 12 directed toward the respective red liquid crystal layer 253r and blue liquid crystal layer 253b may be dispersed by the respective red liquid crystal molecules 32r and the blue liquid crystal molecules 32b. Most of light (r) having red wavelength and light (b) having blue wavelength may be absorbed into the black negative charged particles 33 of the electronic ink layer 300, thereby implementing black.

Effect of a small amount of light (r', b', g') having a specific color, which is dispersed outside, is very small, as described above, since the green pixel (G) implements green, and the red pixel (R) and blue pixel (B) implement black, green can be clearly implemented, and the contrast ratio and the chroma can be improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A driving method of an electrophoretic display that includes a first pixel electrode on a lower substrate, an electronic ink layer on the first pixel electrode, a common electrode on the electronic ink layer, a liquid crystal layer on the common electrode, a second pixel electrode on the liquid crystal layer, an upper substrate on the second pixel electrode, and a plurality of pixels on the lower substrate, the driving method comprising:

adjusting positions of white charged particles and black charged particles in the electronic ink layer by applying a gray voltage between the first pixel electrode and the common electrode; and adjusting the liquid crystal layer with a color voltage configured to be applied between the common electrode and the second pixel electrode, wherein the liquid crystal layer is a cholesteric liquid crystal layer, and wherein the adjusting the liquid crystal layer includes:

implementing white by adjusting the liquid crystal layer corresponding to all of the plurality of pixels to be in a planar state by not applying the color voltage, and by having the white charged particles of the electronic ink layer corresponding to all of the plurality of pixels positioned closer to the liquid crystal layer than the black charged particles;

implementing black by adjusting the liquid crystal layer corresponding to all of the plurality of pixels to be in a focal conic state by applying the color voltage, and by having the black charged particles of the electronic ink layer corresponding to all of the plurality of pixels positioned closer to the liquid crystal layer than the white charged particles; and implementing a specific color by adjusting a segment of the liquid crystal layer corresponding to a specific pixel of the plurality of pixels by not applying the color voltage, such that the segment of the liquid crystal layer is in the planar state, and by having the black charged particles of the electronic ink layer of all of the plurality of pixels positioned closer to the liquid crystal layer than the white charged particles, wherein the implementing of the white, the implementing of the black, and the implementing of the specific color are performed at different times.

2. The method as claimed in claim 1, wherein the specific color implemented in the specific pixel is the same as a color of the liquid molecules of the liquid crystal layer corresponding to the specific pixel.

* * * * *